United States Patent
Sanders et al.

(10) Patent No.: US 6,825,791 B2
(45) Date of Patent: Nov. 30, 2004

(54) DECEPTIVE SIGNATURE BROADCAST SYSTEM FOR AIRCRAFT

(75) Inventors: Royden C. Sanders, Wilton, NH (US); Albin Hastbacka, Amherst, NH (US)

(73) Assignee: Sanders Design International, Inc., Nashua, NH (US)

( * ) Notice: Subject to any disclaimer, the term of this patent is extended or adjusted under 35 U.S.C. 154(b) by 0 days.

(21) Appl. No.: 10/610,432

(22) Filed: Jun. 30, 2003

(65) Prior Publication Data

US 2004/0119631 A1 Jun. 24, 2004

Related U.S. Application Data

(60) Provisional application No. 60/435,093, filed on Dec. 20, 2002.

(51) Int. Cl.[7] .............................. G01S 7/38; F41H 3/00; B64D 7/00
(52) U.S. Cl. ............................. 342/14; 342/13; 342/53; 250/504 R
(58) Field of Search .............................. 342/13, 14, 52, 342/53; 250/342, 504 R; 361/1

(56) References Cited

U.S. PATENT DOCUMENTS

| | | | |
|---|---|---|---|
| 4,621,579 A | | 11/1986 | Badura et al. |
| 4,990,920 A | | 2/1991 | Sanders, Jr. |
| 5,571,621 A | | 11/1996 | Stevens et al. |
| 5,927,648 A | | 7/1999 | Woodland |
| 6,359,710 B1 | * | 3/2002 | Takken et al. .......... 250/504 R |
| 6,420,718 B1 | | 7/2002 | Kreick |
| 6,420,720 B1 | * | 7/2002 | Rubin .................... 250/504 R |
| 6,662,700 B2 | * | 12/2003 | O'Neill ...................... 89/1.11 |
| 2002/0153497 A1 | | 10/2002 | Pepper et al. |

FOREIGN PATENT DOCUMENTS

| | | | | |
|---|---|---|---|---|
| DE | 019605337 A1 | * | 8/1997 | ............. F41H/3/00 |
| EP | 0309097 A1 | * | 3/1989 | ............. F42B/4/26 |

OTHER PUBLICATIONS

Accetta, Joseph S. et al, Countermeasure Systems—The Infrared and Electro-Optical Systems Handbook, 1993, pp 258–268, vol. 7, Infrared Information Analysis Center Environmental Research institute of Michigan, Ann Arbor, MI and SPIE Optical Engineering Pres, Bellingham, WA.

* cited by examiner

Primary Examiner—Ian J. Lobo
(74) Attorney, Agent, or Firm—Maine & Asmus

(57) ABSTRACT

A deceptive signature broadcast system for an aircraft or other emissions generating asset for generating an emissions pattern for masking the normal emissions signature of the aircraft or asset, and protecting it from emissions tracking intercept vehicles such as Infrared tracking missiles; the system includes at least two beacons mounted in a spaced apart arrangement orthogonal to the desired zone of protection, and bracketing the asset, such as on opposite wingtips of the aircraft for fore and aft protection; the beacon set is modulated from one end to the other with a sweeping pattern of emission intensity, deceptively indicating to the intercepting vehicle a lateral component of motion of the aircraft away from its true relative position within the intercept vehicle's field of view, thereby inducing the intercept vehicle to adopt an erroneous and exaggerated lead angle and course correction that results in a missed intercept trajectory.

30 Claims, 5 Drawing Sheets

DECEPTIVE SIGNATURE BROADCAST SYSTEM FOR AIRCRAFT

This application relates and claims priority for all purposes to pending U.S. application Ser. No. 60/435,093 filed Dec. 20, 2002.

FIELD OF THE INVENTION

The invention relates to a system for broadcasting a deceptive radiation signature from an emissions producing asset such as an aircraft, for protection of the asset from radiation seeking vehicles. More particularly it relates to a synchronized, multi-source radiation broadcast system for emitting radiation signature patterns deceptive of the host asset's actual position and path, while masking the normally emitted radiation signature, thereby confounding launches and inducing erroneous lead angle and flight path corrections in radiation seeking intercept missiles or other threat vehicles that are launched against it.

BACKGROUND OF THE INVENTION

The Nov. 29, 2002 attack on a chartered Israeli Aircraft using SA-7 Missiles, has brought to attention the potential danger of portable surface to air missiles to the world's airliners. While the SA-7s did not hit the Israeli Chartered Aircraft, the Israeli Airline, EI Al is believed to have protected their aircraft with electronic countermeasure systems for precisely that reason. Normally the SA-7 has a 20 to 70% chance of destroying the target aircraft. Effective countermeasures specific to the SA-7 and similar threats are available, but at a price of about two million U.S. dollars per aircraft. Some private, corporate, and selected government transport aircraft are equipped with such systems.

It is estimated that there are approximately over 6,000 unfired SA-7 Missiles in the world today and many are on the black market today at $5,000 a piece. There are also approximately 100 unfired U.S.-made Stingers remaining from the Soviet-Afghan war, which are more accurate than the SA-7s.

The SA-7 and Stingers incorporate an infrared (IR) guidance system that "sees" or senses the IR radiation signature or pattern of the target aircraft. The hot burning jet or turbine engines are typically the major contributors of the radiation. Once a signature pattern is placed within its field of view and the guidance system is initiated, it locks onto the signature and transmits guidance instructions to the missile flight control system. Well developed algorithms in the guidance systems provide a continuously updated lead angle for the missile trajectory based on sensed changes in direction and speed of the changes in the relative position of the target aircraft, or more precisely, its radiation signature.

The SA-7 and Stinger missiles are shoulder launched and are effective up to an altitude of 15,000 feet. They can be fired from the ground, from rooftops, boats, and vehicles anywhere in the landing or takeoff pattern of an aircraft.

IR countermeasure systems for aircraft have been developed to thwart these types of seeker missiles. Generally, an IR countermeasure system works by first detecting a missile launch, then initiating a spurious IR signature substantially more intense that that produced by the aircraft's engines, from a location displaced from the aircraft. The source of the spurious radiation is typically ejected or otherwise physically removed or displaced from the immediate vicinity of the host aircraft, as by firing flares or towing a decoy. Thus, the IR guided missile is attracted towards the source of the spurious signature, away from the target aircraft.

Flares used in such systems are typically as much as 20 or more times higher intensity than the emissions being masked. Some threat vehicles are programmed to detect and reject a signature experiencing a very large difference in intensity, and scan for a lower level signature in the vicinity.

One available countermeasure system is available from Northrop Aircraft's Rolling Meadow's Division. Northrop uses a missile launch detector, detecting the missile exhaust plume, and directional IR Sources or lasers. Such a counter measures system may range in price between approximately two million dollars and three million dollars. Rafael, an Israeli-owned company, is offering a similar priced system, which takes 3 months to install. Another system employs an onboard transmitter in conjunction with the threat detection and identification system to send a command signal directly to the incoming missile to redirect it. BAE Information and Electronic Warfare Division, formerly Sanders Associates, offers an "electric brick" and "hot brick" type systems, which modulate an electrical or fuel heated IR source to spoil the aim of the IR Missile.

Other countermeasure systems of note include that described in U.S. Pat. No. 4,990,920, issued to Royden C. Sanders, Jr., filed in 1983 and issued in 1991. The '920 patent disclosed a missile detection system and a RF transponder onboard an aircraft and a towed decoy to separate the transponder. The system has been used with a decoy towed 300 feet behind the aircraft. The system has induced missile misses of 150-feet behind the towed decoy, protecting both the host aircraft and the towed decoy.

With the possible exception of EI AI, none of the world's commercial airlines are equipped with IR Countermeasures. 6,000 Airliners have been built since 1996 and it is estimated that, worldwide, there are more than 9,000 Airliners flying. Lower cost alternatives to existing countermeasure systems would make equipping these airliners more feasible and ultimately make commercial flying safer.

For a more comprehensive understanding of the art, readers may find useful Vol 7. *Countermeasure Systems*, of *The Infrared and Electro-Optical Systems Handbook*, co-published by Environmental Research Institute of Michigan and the SPIE Optical Engineering Press, copyright 1993, revised printing 1996.

What is needed, therefore, are techniques for providing effective, and relatively low cost countermeasures systems for commercial aircraft, and for other fixed or mobile assets that normally emit a radiation signature as a necessary byproduct of their primary function, for evading radiation seeking vehicles of all types, including missiles.

SUMMARY OF THE INVENTION

The invention encompasses both apparatus and methodology, and is susceptible to numerous variations and embodiments. Embodiments of the invention encompass a multiple beacon system of two or more broadcast beacons mounted on the aircraft or other asset for providing a selective or general broadcast of deceptive radiation signature patterns for the protection of the aircraft from missiles equipped with a radiation seeking guidance system. The system emissions may be omni-directional, directional, or bidirectional, and have directionally discrete phasing or common field of view phasing as between beacons. The broadcast emissions may be time or altitude sequenced, based on departure or arrival time or altitude, so as to provide automatic coverage at times and places of highest threat potential.

There may or may not be supplemental or augmenting, ground based or airborne, onboard or remote, missile detection capability used to control or enhance the configuration and operation of the basic beacon system. The effects of a missile detection may be implemented in a simple configuration switching mode or may be applied in a continuous, real time control fashion, or some combination thereof so as to maximize the effects of the deceptive broadcast in the direction of the incoming missile. The most common contemporary threat as discussed above is seen to be operating in the IR (Infrared) range but the invention extends from the full infrared to ultraviolet range inclusively, to address alternative and evolving threats.

In its simplest form, the invention comprises a pair of beacons displaced on an aircraft, preferably one on each wingtip, with synchronized, alternating patterns of emission, at appropriate cycle times, of high and low level intensities of radiation at the wavelength of interest in the normally emitted signature; high level intensity being greater than the normal signature intensity of the aircraft. Using this sweep-modulated broadcast technique, an exaggerated zigzag pattern of intercept is induced, whereby an incoming missile is attracted to the first or lead-off beacon, then swept to the other or trailing beacon by the shifting center of intensity so as to erroneously interpret a lateral motion or displacement of the aircraft that in turn induces an erroneous and excessive lead angle at each zig; then zagging back to the lead off beacon when the broadcast cycle starts anew. When the missile closes with the aircraft such that the first or lead off beacon falls out of the missile's field of view, the missile continues on its last erroneous lead angle, by which time it is likely too late to make a useful correction and the intercept fails.

A greater degree of assurance, effectiveness and protection is provided by the sweep modulation technique of the invention, with its deceptive indication of motion in a selected direction, rather than a simple alternating wingtip, high/low switching of emission levels with a bidirectional result. To this end, the basic system of the invention requires at least two aircraft-mounted radiation sources or transmitting beacons, displaced on or near a host aircraft such as one on each wingtip, or otherwise displaced on the airframe so as to bracket the span of the airframe as seen from the angle or direction of the approaching missile.

The beacons are modulated in a closely synchronized manner to generate a false infrared signature pattern with an intensity that masks primary sources of similar emissions on the host aircraft. To the missile launcher, the oscillating beacon pattern is inconsistent with the expected pattern of a target aircraft; inhibiting in some circumstances the acquisition of a "lock on" signal required for missile launch. To the radiation sensors of a guided missile once launched, the false pattern indicates a continuous diverging of missile and aircraft trajectories as a lateral displacement motion of the aircraft from its actual position within the missile's field of view. This apparent change in position causes the missile to generate an erroneous lead angle and intercept course of sufficient magnitude to take it outside the span of the beacons in the direction of the sweep of the modulation, so as to miss the aircraft.

As will be readily apparent, if the aircraft is in fact turning opposite or away from the direction of the modulation sweep with respect to the missile's field of view during the final closure of the missile to the aircraft, or if the direction of the modulation sweep can be set or controlled so as to be opposite the direction of turn, the probability of a miss and the miss distance are both increased.

Since the system can be operated in a simple broadcast mode, no missile detection capability is required, and any number of incoming missiles will be similarly affected by the broadcast of the false signature. As noted above, the system operation and effectiveness can be enhanced by adding missile detection capability and using alternative beacon configurations, all as is discussed and illustrated herein.

As described above, vulnerability to man-portable and shoulder fired radiation seeking missiles is highest during take-off and landing operations, from the surface up to 15000 feet altitude. Missile shooters prefer to get a head-on or tail view of the aircraft engines where the IR signatures are strongest and where acquisition and firing tones will be sounded as a lock-on signal before firing. The immediate vicinity of runways and airports is generally protected against unauthorized access, but the zone of vulnerability to a surface based missile launch from ahead or behind the aircraft extends some distance out beneath the take off and landing zones. In order to achieve the desired effect, the beacon set of the Applicant's system must be displaced across the apparent width of the aircraft or asset, on or near the structure with respect to the protected field or direction of approach, so as to substantially bracket the aircraft between the first and last beacons. For the best fore and aft zones of protection, this makes a wingtip to wingtip installation the basic configuration of choice. Of course other configurations are within the scope of the invention, depending on factors such as the aircraft or asset size and configuration, the normally emitted radiation signature pattern and intensity of the aircraft or asset, the desired zones of protection, and the type and performance characteristics of the threat vehicle.

As is well understood in the art, jet engine IR signatures of the engine metal at the inlet or outlet fall generally in the 1.5 to 2.5 micron region, or Band #1, which is the reason that threat missile guidance systems operate in this region. However, the jet engine plume is of greatest intensity in the Band #4 region of 4 to 5 microns, and some guidance systems utilize a Band #4 or a dual band sensor system to provide greater reliability of the tracking system. The invention is therefore inclusive of multi-band IR beacons.

As will be further appreciated by those skilled in the field, significant high intensity radiation at other than IR wavelengths may be detectable on or being emitted from various possible sources on an aircraft. Recognizing that multi-band sensors are not uncommon and may be expanded or revised to target other peak intensity wavelengths of the aircraft's total radiation signature, the invention contemplates the use of single, dual and multi-band beacon systems that emit deceptive patterns of radiation in any mix of wavelengths from ultraviolet through long wave infrared inclusively, at which guidance systems may be known or developed to detect and track. The bands or wavelengths may be switchable or selectable in some beacons and some system configurations, to address different threats at different times and places.

It is therefore a goal of the invention to provide an asset or aircraft radiation broadcast system for inhibiting the target acquisition or "lock on" function of a seeker in preparation for firing, and hence reducing the likelihood of the launch of a radiation seeking missile. It is likewise a goal of the invention to provide an asset or aircraft system for diverting incoming radiation seeking missiles from hitting the host aircraft or asset, by emitting a deceptive radiation pattern that evinces a displacement of the asset from its true position or path with respect to the incoming seeker. It is another goal to provide an automated such system independent of any missile or threat vehicle detection capability. It is yet another goal to provide a system of modulated onboard radiation beacons, particularly infrared beacons, of a total intensity that will mask the similar wavelength emissions from the aircraft, sweep modulated in closely synchronized combination such as to deceive a radiation seeking missile into making erroneous flight corrections to its lead angle and flight path so as to miss the aircraft and fail its intercept mission.

It is still yet another goal to provide a configurable aircraft system of multiple beacons working in conjunction with a missile detection capability for providing enhanced emission patterns of a deceptive signature. It is likewise a goal to provide an air transport system using airports configured with local area missile detection systems and missile warning transmitters in conjunction with aircraft configured with missile warning receivers and systems for broadcasting deceptive signature patterns.

A fundamental principle of the invention is to have at least two beacons located on or near the host asset or aircraft so as to position the host substantially between the beacons with respect to the field of view of a missile launcher or incoming radiation seeking missile. Another principle is to ramp down the intensity of one beacon as the originating or first beacon, from a maximum value greater than the intensity of the normal emissions of the aircraft to a threshold value, and to concurrently ramp up the intensity of the terminal or last beacon of the set from the threshold value to maximum. The sum of the intensity of the two or more beacons of the set remains at or above a level required to mask the normal emission signature of the aircraft.

This closely synchronized sweep modulation of the beacon system portrays to the guidance system a repetitive, apparent continuous shifting of the total pattern or center of the radiation. The sweep or movement of the center of intensity from one end to the other end of the beacon set is erroneously interpreted by the missile guidance system as a displacement of the aircraft in the direction of the beacon of increasing intensity, the last or the terminating beacon. The modulation profile or change of intensity at the beacons may be linear or otherwise; the sweep cycle time being intentionally designed to be within the guidance system's ability to register as requiring a compensating change of lead angle.

Yet another principle of the invention is the inclusion of a snapback time at the end of the modulation cycle for resetting all beacons in the set to their respective initial high and low power settings. A snapback or reset time is sufficiently short that it has no significance to the missile or guidance system response time.

When this pattern of sweep modulation and snap back is repeated in synchronous fashion by the beacon set, the deceptive signature indicating an apparent movement in the selected direction causes the missile to make an oscillating or zigzag-like approach. The missile makes a long "zig" for the duration of the sweep cycle to follow the deceptive signature sweep, and builds in a correcting lead angle that would lead to a missed trajectory by the guidance system. At the point that the sweep cycle ends and the snapback occurs, if the first beacon remains within the field of view of the seeker, the seeker may "see" the first beacon restart and begins a reversing "zag"; a correction back towards the first beacon within the limits of its response time. The attempted course reversal or "zag" is of short duration, however, as the sweep modulation immediately induces another reversing "zig" in to direction of the signature sweep, with its longer duration, again inducing an erroneous correcting lead angle in the direction of the signature sweep. Eventually, when the missile is close enough, the originating or ramp down beacon, or beacons, fall out of the field of view. Thereupon, the missile continues on its last erroneous lead angle, taking it outboard of the last or most outboard beacon and wingtip, resulting in a missed intercept.

Still another principle of the invention is the expansion of the beacon set to a sufficient number of beacons that the modulation sweep is reduced to a simple, sequential, on/off cycle of each beacon synchronized as a sweep of intense emission from one end of the beacon set to the other. Stationary assets such as a nuclear plant or oil drilling rig may be more amenable to this protective approach than aircraft, for example. Several factors including the structural configuration, environment and operating characteristics of both the host structure and the threat vehicle, will determine the optimal beacon set configuration.

Yet another fundamental principle of the invention lies in the two different types of beacons or principle modes of modulating the respective beacon intensities. A first mode or beacon type employs an emitter or radiation source operated at uniformly maximum radiation intensity and confined by a moving mechanical mask or modulating screen, shutter or shield. The modulating mechanism may be operated in a manner that generates a directionally dependent instantaneous phase value or relative value of intensity as between the minimum and maximum emission intensities. A rotating shield embodiment with a window of varying width is disclosed below, although other forms of modulating screens in relative motion with respect to the radiation source are within the scope and intent of the invention. One or more secondary shields may be use to provide a limited or selected field of effective radiation. These field of view shields may be stationary or directionally variable depending on system configuration. Other mechanical modulating mechanisms may generate an omnidirectional change in intensity between maximum and minimum limits. For example, a tube-like shield may be extended lengthwise to enclose or expose the emitter or radiation source.

A second mode of modulation employs electronic or direct modulation of the intensity of the emitter or radiation source of each beacon, as for example by modulating the input power or fuel flow, so that the phase or point in the modulation cycle is omnidirectional or independent of the direction from which the beacon set is being viewed or approached. No relative motion of a modulation screen, mask or shield is needed, although the source may be otherwise shielded to provide a limited or selected field of effective radiation as in the first mode. A "flash lamp type" IR source embodiment with source intensity modulation is disclosed below, although other types of sources susceptible of direct source modulation as for example by modulating the power input or a gating voltage or current, are within the scope and intent of the invention.

As will be apparent to those skilled in the art, the alternative modes of beacon modulation have implications with respect to multiple beacon configurations and selective beacon combinations as might be desirable particularly when the system is to be operated with variable or selectable directional priorities, or with a missile detection input that provides automated directional priorities. The reconfigurable multiple beacon embodiments disclosed below are indicative and not limiting of the scope of the invention in this regard.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
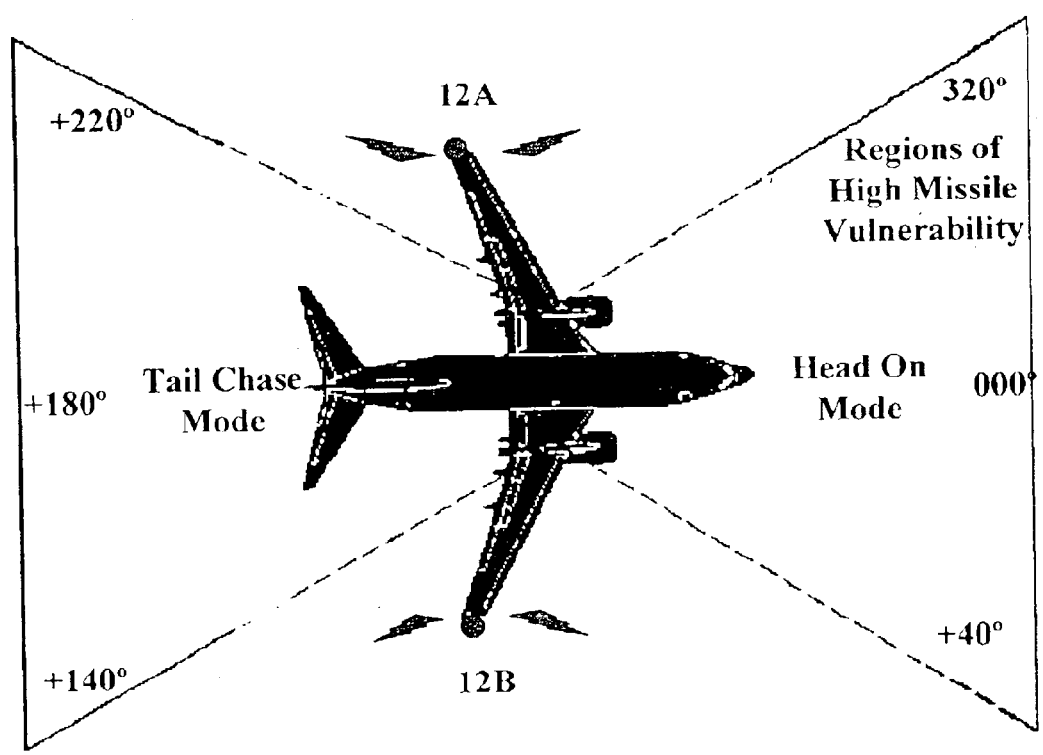
FIG. 1 is a plan view illustrating an aircraft equipped with a deceptive radiation signature system in accordance with one embodiment of the present invention.

The invention is capable of many embodiments. As will be appreciated by those skilled in the art, the embodiments described and shown are exemplary and illustrative, but not limiting of the scope of the invention.

Simulations arc usefull in establishing the effectiveness of the invention. The parameters of an assumed threat missile similar to an SA-7 were used in preliminary simulation calculations as shown in Table 1. The two right hand column parameters were chosen that best represent the missile flight parameters and the beacon separations of 100 feet for medium size aircraft and 50 feet for smaller fighter or business aircraft. Similar simulations can be done for larger heavy category aircraft of 150 feet or more beacon separation. In each case the ramp or modulation cycle time will be approximately 0.9 seconds for the 100-foot separation and 0.5 seconds for the 50-foot separation case, respectively. Optimal cycle times may vary with aircraft type and installation details, requiring specific testing and re-tuning.

TABLE 1

Simulation Parameters

| Simulation Parameters | 100 ft separation | 50 ft separation |
| --- | --- | --- |
| Ramp (modulation cycle) Time | 0.9 seconds | 0.5 seconds |
| Time to go (Emission starts) | 8 seconds | 8 seconds |
| Missile velocity | 1700 ft/sec | 1700 ft/sec |
| Missile acceleration | 6 g's max | 6 g's max |
| Missile time constant | 0.3 seconds | 0.3 seconds |
| Missile beam width | 2 degrees | 2 degrees |
| Beacon spacing | 100 ft | 50 ft |
| Engagement distance | 10,000 ft | 10,000 ft |
| Aircraft velocity | 400 ft/sec | 400 ft/sec |
| Aircraft acceleration | 0.2 g's | 0.2 g's |

The signature sweep rate per unit of span is preferable set for close to, but not higher than the missile performance anticipated. The ramp or modulation cycle time is selected with respect to the beacon spacing as the maneuver rate necessary to cause the missile to turn at approximately 6g rates for most effect. The time to go is the minimum time the beacons must be broadcasting before a missile attack takes place. The missile flies to its maximum range at about 1700 feet per second average velocity. Maximum missile acceleration is limited to 6 g's. The missile time constant is 0.3 seconds to respond to steering commands. The Missile IR seeker beam width is 2 degrees. Beacon spacing is the distance of separation on the actual host or target aircraft. The engagement distance is set for 10,000 feet down range. The aircraft velocity is typically 400 feet per second. The target aircraft is set to about 0.2 g's acceleration. Three simulation cases were performed and are presented here for average, closest approach, miss distance predictions of 29 feet or more as follows: (1) Head-on mode simulation with 100 foot beacon separation for medium aircraft; (2) Tail chase mode simulation with 100 foot beacon separation for medium aircraft; and (3) Tail chase mode with beacon separation of 50 feet (military fighter or business aircraft).

Case 1—Head-on Miss Distance, B-737 or A320 Series Aircraft

The first simulation set was conducted for head-on missile approaches over a range of plus and minus 40 degrees from zero degrees or head on, using 100-foot beacon separation simulating a B-737 aircraft wingspan, with parameters as listed in Table 1 This aircraft was selected as a general case because it is among the world's most ubiquitous airplanes in commercial use. The modulation waveform of FIG. 2 was used as the simulated system emission pattern, ramping down at beacon A on the port wingtip and up at beacon B on the starboard wingtip. The alternating flashing of the beacons caused the missile to fish tail from one beacon to the other once it got close enough to the target aircraft to discriminate between them. However, as the missile more closely approached the oncoming aircraft, the seeker was finally reduced to reacting to the final ramp up of the beacon B starboard wingtip, making a final abrupt maneuver toward the starboard side that went beyond the starboard wingtip. The simulation results for the system of FIG. 1 produced miss distances that varied from 29 to about 50 feet, depending on the approach angle of the missile; the zero angle head on approach producing the best result and the average miss distance being about 37 feet.

Case 2—Tail Chase Miss Distance, B-737 or A320 Series Aircraft

This case is similar to the previous simulation set except that the missile is approaching from the rear or 180 degree angle of the target aircraft. Miss distances off the starboard wingtip reached 97 feet at a straight on angle, diminishing to 20 feet at the outer approach angles. The average, closest approach, miss distance was 30 feet. Most missile attacks occur from the rear of the aircraft where the engine plume and engine heat signatures are the greatest amount.

Case 3—Tail Chase Miss Distance for Small Aircraft

This case is similar to the previous simulation set where the missile is approaching from the rear of the targeted military fighter or business class aircraft with separation of wingtip beacons of about 50 feet. The best miss distance result was 33 feet, diminishing to about 10 to 20 feet at outer angles. The average, closest approach, miss distance was 20 feet. The head-on approach for the smaller aircraft provides results comparative to the difference in fore and aft cases of the larger aircraft case.

In accordance with the above simulations, one embodiment of the present invention provides such a system where two Infrared (IR) beacons are mounted on the respective wingtips of a host aircraft and used to mask the aircraft's actual position from missiles equipped with IR guidance systems. Each beacon includes: a stationary infrared emitter or source enclosed within a rotating shell incorporating an IR emission window by which the source output is modulated between low and high. In preferred embodiments, the low or threshold level intensity of a beacon is about 1.3 times normal emissions of the aircraft so as to remain visible to the seeker as compared to the normal aircraft emissions intensity, and full intensity is not less than about 2.0 times normal aircraft emissions intensity. Although a lower differential between the normal and the low or threshold beacon intensity, and/or a full beacon intensity of less than twice normal aircraft emissions intensity, may still be effective for confounding some seekers.

It should be noted again, that while contemporary threats are generally expected to be in the short and medium Infrared range, the invention extends to long wave infrared, visible light, and ultraviolet wavelengths as well, where new and evolving threats can be expected to materialize.

The modulation screen, or in this embodiment a circular casing or shell on each beacon, consists principally of an infrared radiation shield within the surface of which is configured a tapered window. The single band IR source is stationary within the modulation shell. The modulation shell is motorized for rotation about the TR source. The shield inhibits emissions from the IR source in all directions except through the window. The window permits radiation to be emitted in increasing or decreasing intensities with respect to any nominal direction from the beacon, depending on beacon orientation and shell rotation speed. The infrared shield may be made from inconel, or gold plated inconel, or other suitable materials as are known in the art, that preferably reflect rather than absorb the radiation. Good reflection helps conserve power and keeps the shield cooler.

The two beacons have a common orientation with respect to the poles of rotation of their modulation shells. The modulation shells are closely synchronized with respect to their directional orientation so that they can be rotated continuously about their respective IR sources while remaining in this precise relative orientation.

The function of the rotating shell is to vary the intensity of the infrared signal visible from its beacon location on the aircraft, with respect to an incoming IR seeker missile. The coordination of the rotation of shells of two or more infrared beacons spanning the wingtips of the host aircraft provides a total effect somewhat analogous to a pair of properly displaced stereo speakers portraying a train passing from left to right. One speaker is at low level volume ramping up in output intensity while the other is at high output ramping down in output intensity.

As previously explained, when a beacon set utilizing direct modulation of the source or emitter of the IR, or such other band or bands of radiation as may be the case, is employed the radiation pattern from each beacon has an omni directional, common phase characteristic; the relative intensity of a beacon being the same in any direction not shielded.

It should be noted that there are within the scope of the invention mechanical embodiments of an omni directional phase beacon, for example a sleeve and rod-like source where the sleeve (or source) is longitudinally extendible and retractable at ramp or snapback speed so as to expose or cover the source (or be exposed or be covered by the sleeve) and thereby modulate emissions from the beacon to the same omni directional effect as modulating the power input to the source. Various shutter arrangements are useful in embodiments of limited ranges or fields of emission. Shutters may likewise be operated so as to produce a substantially linear rise or decay of emission between the low and full intensity levels, followed by a snapback reversal. Clam shell and other closure and covering mechanisms providing a modulating effect over an emitter of any sort, for a useful field of view, are likewise within the scope of the work.

In another aspect of the invention, as will be appreciated by those skilled in the art, the thin profile of a typical wingtip airfoil can pose a challenge with respect to a low drag beacon design and installation. It is within the scope of the invention to incorporate one or more beacons within an existing or specially designed winglet having some degree of vertical orientation with respect to the wing. The introduction of winglets to existing airframe designs can actually introduce performance benefits with respect to the aircraft, all as is well understood in that art. The vertically oriented interior volume of new or existing winglets offers configuration opportunities not present in a conventional wingtip design.

Other host structures and unique situations may pose other beacon mounting challenges that enter into the overall system design and layout, independent of the concept of the invention. Helicopters, tanks, and other relatively small or narrow profile vehicles might, for example, employ outriggers. Some aircraft configurations might employ some manner of extending beacons forward or aft, or vertically up or down, from selected points on the airframe or wing to insure adequate coverage from desired directions.

In the case of aircraft in particular, a weatherproof envelope or outer shield, made of material substantially transparent to the emissions of interest, is required to provide a streamlined exterior shape and protect the functional components of the beacon from exposure to the elements. A material such as sapphire, for example, is transparent to IR emissions through band 4, about 5 microns wavelength.

With either beacon type, when a broadcast of a deceptive signature in accordance with the aircraft embodiments of the invention is initiated, the emission cycle of the beacon on a first wingtip of the host aircraft starts at full intensity and is a gradual decrease in intensity followed immediately or at some time thereafter by an abrupt drop or snapback to full intensity for the next cycle. The emission cycle of the last beacon on the opposite wingtip may include a dwell time at low intensity in the case of more than two beacons, followed by a gradual increase to full intensity, followed by an abrupt snapback to low intensity for the next cycle. The sum of the IR emissions of all beacons in the set, viewed from a common direction, is more or less constant, and is substantially greater than the intensity of the IR emissions of the aircraft engines so as to mask the normal emissions signature.

A missile attempting to fly an intercept course from aft or behind an aircraft with a system consisting of a rotating shield type beacon on each wingtip as is described below, based on the total infrared signature of the aircraft, will perceive the aircraft to be moving from left to right (or right to left if shell rotations or the direct modulation cycle are reversed) from its actual flight path and will correct its lead angle and intercept trajectory accordingly. While both beacons remain within its field of view, the missile is led through a continuous zigzag race to catch the elusive false pattern as it appears to move in one direction from the first beacon towards the second, then redirects back to the first beacon when it relights and repeats the apparent movement towards the second beacon again with an erroneous lead angle calculated for intercept. By the time the missile closes sufficiently to lose the first beacon from its field of view, the last lead angle correction makes the missed intercept trajectory highly probable.

Figure 3:
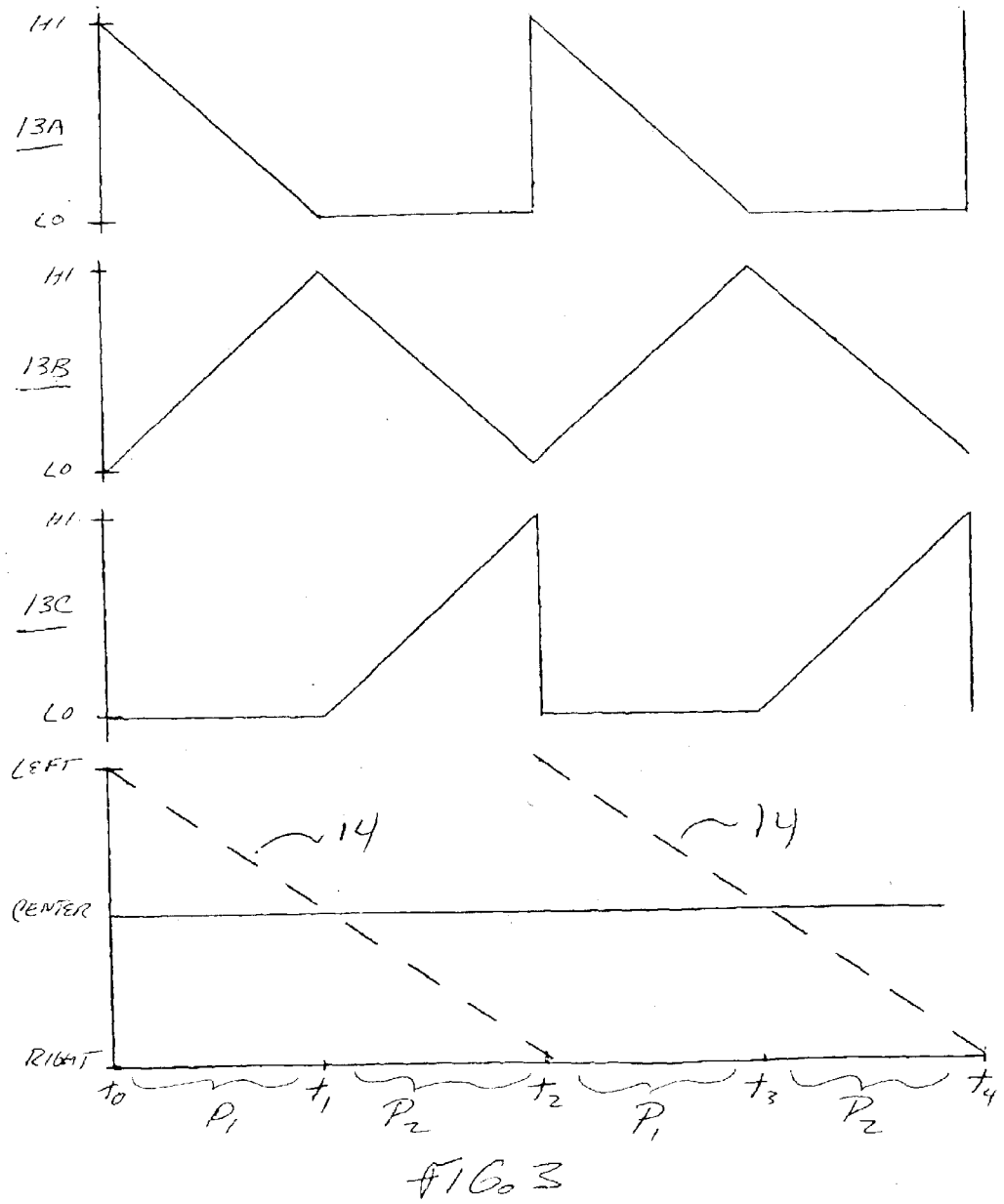
FIG. 3 is a graph illustrating the relative intensity level versus time of a synchronized, three beacon set, and the effective false indication of position from left to right versus time, as perceived by a missile guidance system sensing the three beacons.
Figure 5:
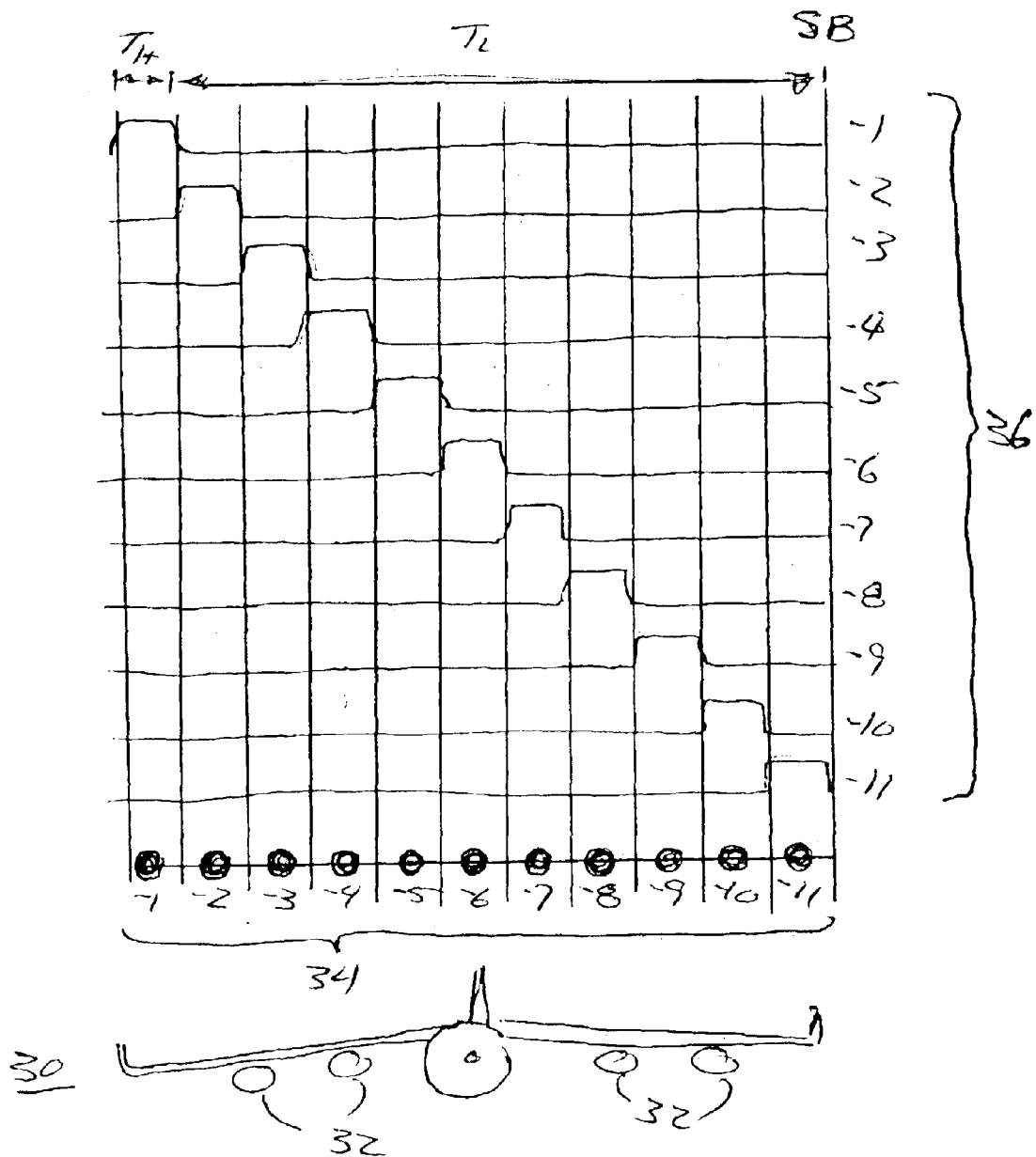
FIG. 5 is a composite diagrammatic presentation of a host asset, a spanwise equivalent multiple beacon system of the invention, and a corresponding modulation chart showing one cycle of the on/off pattern of signature sweep.

Jumbo jets or heavy aircraft tend to have wingspans greater than 150 to over 200 feet from wingtip to wingtip. These aircraft may require mounting more that two beacons, in order to assure that at least two beacons remain within the missile's field of view during the close-in approach. As is illustrated in FIGS. 3 and 5 and more fully explained below, three beacons or more on a line can be used to good effect. For example, there can be one beacon on each wingtip and one on the belly, modulated to the same effect as two beacons, wherein the port beacon starts at full intensity and ramps down while the belly beacon starts at threshold intensity and ramps up to maximum during a first period P1, thus migrating the apparent center of radiation from port wingtip to centerline. Then, the belly beacon modulation cycle reverses direction and ramps down to threshold intensity while the starboard beacon ramps up to a maximum during second period P2, thus further migrating the apparent center of radiation from centerline to the starboard beacon.

The sum of periods P1 and P2 are the system cycle time. It will be apparent in this configuration that each outboard beacon has a dwell time of P at threshold intensity awaiting its turn in the cycle. At launch, an incoming missile will have all three beacons within its field of view, and will react as elsewhere described, with induced erroneous lead angle corrections resulting in a zigzag motion. As the missile closes, the lead-off beacon on one wingtip, the one with the initial ramp down modulation curve, will drop out of the missile's field of view, but the remaining beacons still perform to the same net effect, and so on. When the second to last beacon drops out of the field of view, the last erroneous lead angle correction assures the missed intercept trajectory.

Additional beacons and other beacon placement, such as wingtips and tail, and other modulation schemes producing a deceptive radiation pattern that masks the aircraft's true position and induces an erroneous lead angle and trajectory change of an incoming missile, irrespective of missile detection, are within the scope of the invention.

Also, particularly on aircraft employing a complex array of more than two beacons, a low cost missile warning system (MWS) may be used to cue the beacon system as to what approach angle relative to the aircraft an approaching missile has, and to switch to a particular mode or exercise a continuous control over the beacon system operation. With the low cost MWS system, three beacons triangularly located at the wingtips and tail, respectively will provide an effective counter-measures configuration. The deceptive signature beacon system can also be used with the Common Missile Warning System (AN/AAR-57) should this type of MWS be preferred.

The cases and embodiments discussed above relate mainly to commercial aircraft. However, the same principals and performance also apply to a broad range of military aircraft from fighters, to transports, and bombers. Helicopters are problematic due to the general lack of wingspan; however some configurations such as tilt-rotor Ospreys or airframes with existing outriggers may be adaptable. Others may require structural modifications.

Referring now to FIG. 1, there is illustrated a plan view of an aircraft including a system in accord with one embodiment of the present invention. The system uses at least two IR beacons 12; beacon 12A installed on the port wingtip and 12B on the starboard wingtip of the aircraft. In this case, the beacons are separated by a distance of about 100 feet and are mounted in a prominent position for observation by missiles approaching along the axis of the aircraft. The outboard and inboard side regions of the beacons may be shielded, shrouded or blanked so as to not radiate outward from the sides of the aircraft. The fore and aft fields of emission are bounded by the dashed lines at plus and minus 40 degrees off the centerline, and indicated here with their relative bearing off a forward centerline reference of zero (0) degrees. Alternative embodiments may include additional IR beacons mounted on other areas of the aircraft, such as the tail and/or nose, configured for different or additional fields of emission.

Figure 2A:
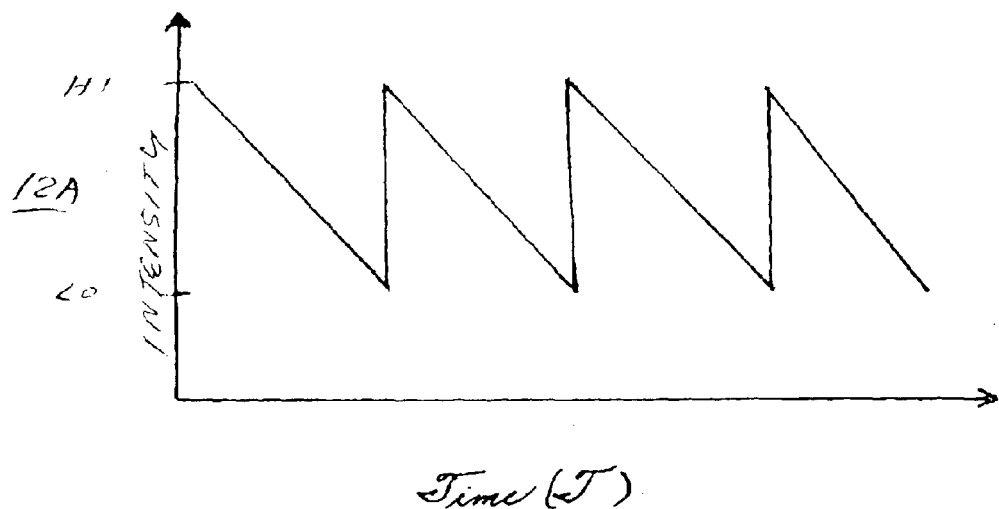
FIGS. 2A and 2B comprise a graph illustrating the intensity of radiation emitted by a synchronized, two beacon set in accordance with one embodiment of the present invention.
Figure 2B:
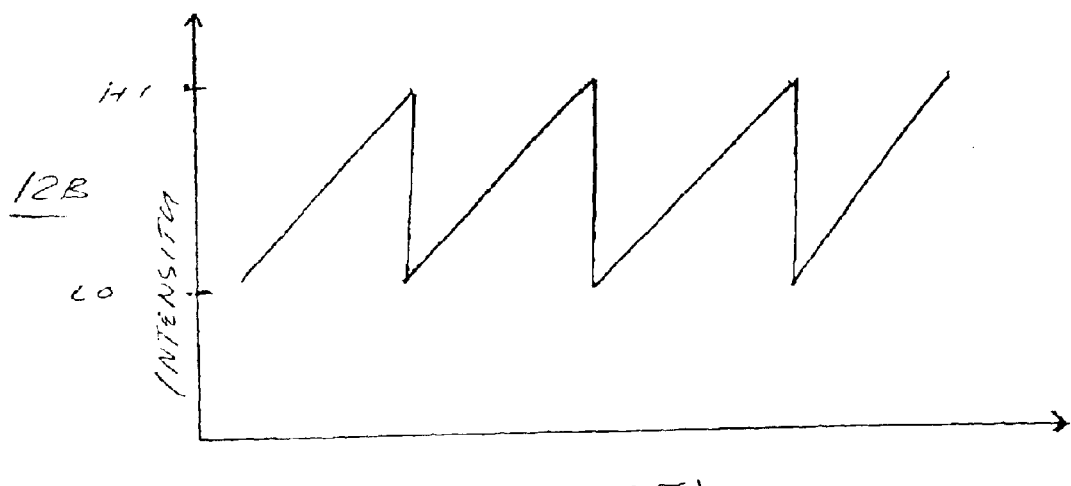

Referring to FIGS. 2a and 2b, there illustrated are graphs of the intensities of the respective left and right side beacons 12A and 12B of FIG. 1, of the IR radiation intensity over time emitted from each beacon as seen, for example, from aft of the aircraft by a missile with both beacons within its field of view. These modulated patterns of IR emission are coordinated and synchronized for generating an increasing signal from beacon 12B and a decreasing signal from beacon 12A, or visa-versa, at a preferred speed or sweep time of from 0.25 seconds to 1 second, as measured from t1 to t2, The scan begins at any t1. When the modulation sweep or intensity ramp cycle is completed, the emission intensity level at each beacon snaps back at time t2 and repeats itself. Beacon position, spacing, and effective displacement speeds may be varied or variable, according to other and advanced embodiments adapted to or adaptable to other missile characteristics and defensive scenarios.

As is clear from the figures, the two beacons are synchronized for simultaneous snap back. It should be noted for the rotating shell embodiment that rotation speed is constant; snap back occurs as a result of the window's leading or terminal edge switching the emission in a particular direction from low to high or vice versa as the shell or cage rotates. The snapback time of the emission cycle for the rotating shell embodiment of the beacon is in the order of 50 milliseconds, much smaller than the ramp time and much faster than the response time of most known missiles.

The effect of each sweep or modulation cycle, at the missile's guidance computer, is a false signature or deceptive indication that the aircraft position is moving from left to right within the missile's field of view, relative to it actual position and flight path. The false signature induces a change of lead angle in the missile's guidance system to the right, ultimately resulting in a missed intercept, typically by 25 to 200 feet. Since most surface to air IR guided missiles have contact fuses, such a miss distance is acceptable. Digital simulations have confirmed the usefulness of this approach. Other embodiments may employ longer or shorter sweep times and/or snap back times, using mechanical or electronic techniques.

Referring to FIG. 3, there is a three beacon system for an aircraft with a larger wingspan, for example a 150 foot wingspan. The three beacons 13A, 13B, and 13C are arranged in a line spanning the aircraft from wingtip to belly to wingtip, and are operated in a serial sequence of changing intensities that results in essentially the same deception of signature pattern as in FIG. 2. During period P1, from t0 to t1, beacon 13A ramps down while beacon 13B ramps up, and beacon 13C remains at low intensity. During period P2, from t1 to t2, beacon 13A remains at low intensity while beacon 13B ramps down and beacon 13C ramps up. At time t2, beacon 13A snaps back to full intensity, and beacon 13C snaps back to low intensity. This completes a full modulation cycle, which is then repeated through times t3, t4, and so on. It will be readily apparent that the average radiation intensity of the three beacon system remains substantially uniform, from the perspective of an approaching missile.

Still referring to FIG. 3, the apparent position of the deceptive signature pattern generated by the waveforms of the three beacon set is illustrated in dashed line segments 14, ranging from left through center to right at a uniform rate over a full cycle or sweep of the beacon set. The false pattern is repeated continuously, creating the zigzag missile trajectory across the full beacon set until the sensors are too close to pick up the beacon 13A. Thereafter, for a short time, the missile guidance system reacts only to beacons 13B to lose beacon 13B from its field of view, it is still reacting to the last modulation cycle with a right biased lead angle. The remaining time to target is too short for the next beacon 13C ramp to provide a useful correction, so the missed intercept is already probable.

A four or more beacon system may be similarly oriented and operated. Also, while uniform beacon spacing is preferred, some degree of unequal spacing can be tolerated so long as the ramp timing of adjacent beacons is adjusted for the difference, so as to maintain a uniform signature sweep rate across the full set.

Referring to FIG. 5, In the limit, and within the scope and claims of the invention, the methodology of the invention extends to a beacon set 34, that is a string of several beacons 34-1 through 34-11, configured to span an asset 30, such as a large aircraft, that has a significant source or sources 32 of signature quality emissions. The beacons are relatively closely spaced and operated in sequence as illustrated in chart 36, so as to create the same modulation effect as a multi-element sign indicating a lane merge on a highway construction project, or the instrument approach lights on an airport runway that strobe in a repetitive sweep pattern towards the runway threshold.

When the number of beacons in the span is larger, preferably at least five, and spacing of the beacons is sufficiently small relative to the full span of the beacon set, preferably not more than ⅕span, the requirement for modulation of each individual beacon, e.g. 36-1, may be reduced to a simple synchronized switching to high intensity for time $T_H$ and back to low intensity for time $T_L$, such that the net effect of all beacons 34-1 through 34-11 with respect to the seeker is substantially the same as in other embodiments. This may simplify the design and operation of the individual beacons.

Longer and shorter sweep times than the approximately 0.25 to 1.0 second may be desirable whether controlled by fixed or variable means, depending on beacon spacing and anticipated defensive requirements. For example, for a 50 foot beacon span, a 0.5 second sweep time may be effective. For a 200 foot span, a longer total time will be required.

As long as at least two modulated IR beacons are within the FOV (field of view) or beam width of the missile, the missile thinks the aircraft is moving the distance and direction between the two beacons in the sweep time provided, and responds with a correction to its intercept path in the direction of the sweep. By then snapping off the last beacon and restarting the beacon set with a new modulation sweep, the target or host aircraft appears to the missile to continue to emit the same deception, inducing a further correction in the same direction to the missile's intercept path until the missed intercept trajectory is probable.

Figure 4:
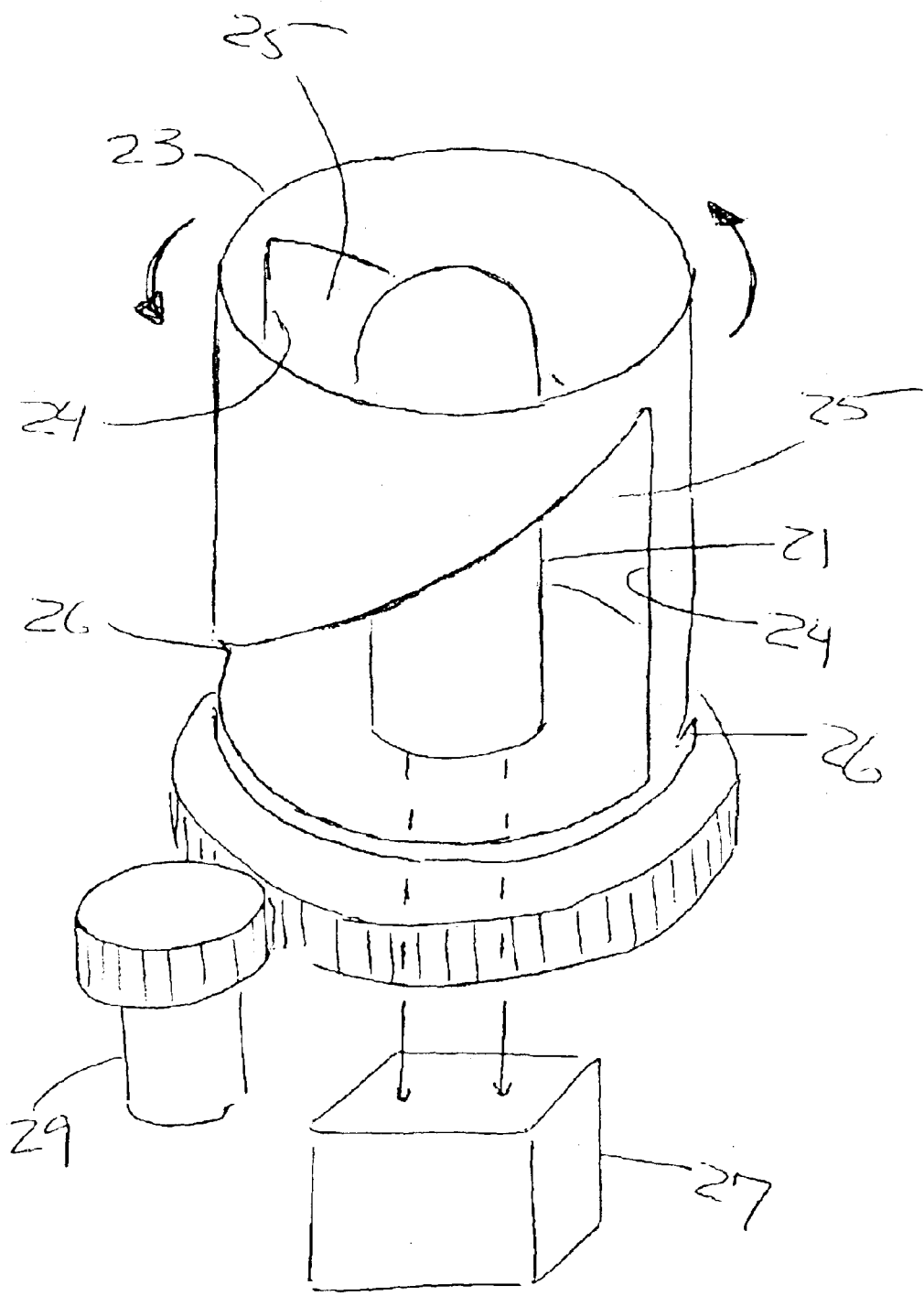
FIG. 4 is a diagrammatic perspective view of a mechanically modulated infrared beacon used in a countermeasure system in accordance with one embodiment of the present invention.

Simulations of one embodiment of the present invention obtain adequate miss distances, both when the time to target of the missile is known and when it is not known. Other embodiments of the present invention utilize algorithms that do not need to know when the missile is launched, or how many missiles are launched. Referring to FIG. 4, one embodiment of the present invention utilizes an IR source 21, that emits in Band 1 and Band 4. In this embodiment, stationary IR source 21 is configured within and surrounded by a rotating cage 23 which is preferably cylindrical, but may be conical or spherical to some degree, and is routable on a fixed axis about IR source 21. Power to the IR source is provided by IR source power supply 27 through axial leads, so as to accommodate the rotating cage 23. The rotating cage is a cast shell, an IR shield cast in one embodiment from Inconel, a steel alloy with high nickel content that is resistant to high temperatures. The cast shell incorporates at least one open window 25, two windows in this embodiment arranged around the cage with leading edge to trailing corner, through which JR radiation is emitted. The cage may be rotated by a servo motor assembly 29 which is connected to a host aircraft power source or an independent power source.

The window 25 has a leading edge 24 that is aligned with the axis of the cage, for causing an abrupt turn on or shut off of beacon emission with respect to a remote missile seeker, as the cage is rotated about the IR source. The width of the window from the first edge 24 and wrapping around the cage is progressively smaller, tapering down to zero at trailing corner 26, just before reaching its own leading edge or the leading edge of a next similar window. This leading edge and trailing corner shape causes the ramping down of intensity as the cage turns. The orientation of the cage and window in the beacon on the other side wingtip of the aircraft is configured as a mirror image of the first beacon, while the direction of rotation remains the same. This results in the second beacon having a leading corner and trailing edge shape for ramping up intensity as this second beacon rotates.

Again, the rotation of the cages of the two beacons is in the same direction, and the radial orientation of the first edges of each window are the same with respect to their IR sources so that from any given direction, the window of one beacon opens as the corresponding window of the other beacon closes. The rotation of the cages with their tapered windows creates a deceptive total pattern of infrared radiation, with respect to a selected direction or an incoming IR guided missile, indicating displacement of an apparent IR source from the leading edge beacon towards the trailing edge beacon, which is the desired countermeasure effect.

Windows may be other than tapered to create the same ramp effect in intensity, such as by incorporating multiple small lens in the necessary patterns. Each cage may incorporate more than one window in a serial or head to tail arrangement, so that effective rotation speed is multiplied by the number of windows.

In other embodiments, a hybrid system of modulation is employed. For example, in one omnidirectional phased embodiment a tubular shield is configured to be extended lengthwise from either end of the emitter to cover or sheath the emitter, and to be retracted to expose the emitter. A quick retraction followed by a slow extension of the shield over a high intensity emitter is equivalent to the snapback and ramp down functionality previously described for a first or lead-off beacon. In yet other embodiments, modulation may be a hybrid arrangement of mechanical shielding and emitter control. There may be a shielded emitter power up ramp to high intensity followed by a quick mechanical retraction of the tubular shield that equates to a high intensity snap on; followed by relatively slow power down ramp of the emitter to lower intensity that is by itself functionally equivalent to a ramp down as previously described, whereafter the shield is extended to permit the next cycle of power up on the emitter.

Emitters in IR or other bands that may be used in the beacons of the invention are available from a variety of sources. Examples of suitable IR sources include, the "flash lamp type" high voltage and low current. An alternative method, the hot brick, fuel fired type, that typically uses JP-4 jet fuel. Either IR source can be satisfactorily used in this invention, and the use of these and other IR sources, whether mechanically or electronically modulated or some combination thereof, are within the scope of the invention. Liquid crystal modulators, whether transmissive or reflective, are within the scope of the invention, as are special light modulators. New and heretofore unknown emitter types and constructs of single and multi-band capability, fixed, variable, and switchable in any manner in mode, field of view or modulation, are within the scope of the invention.

As is readily apparent to those skilled in the art, there are other and numerous examples of the invention, all within the scope of the description, drawings and claims. For example, the beacon of FIG. 4 can be further modified with an additional fixed outer shell or partial shield with one or more fixed windows of preferably rectangular proportions that provide a directional field of emission or limited radial range of emission to the beacon's modulated emission pattern. Multiple pairs of beacons can be arranged by this limitation to provide coverage in different directions such as orthogonally on an aircraft for protection from the rear quadrant with wingtip beacons for apparent lateral displacement, and from either side quadrant with a beacon pair consisting of a nose or wingtip beacon and a tail beacon for apparent displacement along the line defined by the relevant beacon pair.

As another example, the system can be integrated with an onboard missile detection system or connected to airborne communications equipment receiving signals from remote missile detection systems, whether aerial or ground or sea based, for receiving real time information for automated or manual actuation, modification, or reconfiguration of the deceptive signature broadcast system operating parameters.

One embodiment illustrating this example is an air transport system incorporating the invention installed on aircraft and a remote missile detection capability. It consists of: (1) one or more airports located in high risk areas for possible attacks by seeker type intercept missiles; (2) each airport having one or more strategically placed missile detection systems, whether ground-based or airborne, arranged to provide a zone of coverage around the airport for detecting and resolving probable missile launchings, the one or more detection systems having an up-link transmission capability for sending missile warnings and/or control signals to all or selected airborne receivers on aircraft in or near the zone of coverage; and (3) participating aircraft configured with the deceptive signature broadcast system of the invention and with the receivers for receiving the missile warnings or control signals which are used to initiate or alter the configuration and/or operation of the deceptive signature broadcast system so as to optimize the deceptive signature effects with respect to the detected threat. The general level of knowledge in the associated arts when combined with the description of the invention provided herein is sufficient for one skilled in the art to make and use these embodiments of the invention.

As yet another example, the principles described herein are equally applicable in any medium to any fixed or moving platform susceptible of attack by an intercept vehicle guided by a proportional navigation or related guidance system that generates a lead angle for controlling the intercept trajectory. The beacons need relative displacement on or near the platform and modulation sweep speeds appropriate to the field of view, closure rate, and maneuvering capability of the intercept vehicle.

The deceptive signature pattern broadcast system needs only to be activated and functioning during periods or places of vulnerability. There need be no detection capability on board or associated with the host platform. Seaborne; undersea and outer space mediums, host assets, and threat vehicles are included. Land-based vehicles and stationary facilities are likewise protectable to the extent described. Threat vehicles include aircraft, missiles, land and sea surface borne vehicles, and torpedoes. Embodiments of the invention extend to protective systems for planes, helicopters, ships, tanks, trucks, amphibious vehicles, reentry space vehicles including ballistic missiles, and even to stationary targets such as sea based oil rigs, power plants, pumping stations, and any mobile or fixed asset for which some type of signature quality or targetable electromagnetic emissions is a necessary byproduct of its normal functionality.

Other and various examples are within the scope of the invention. For example, there is a system for altering the radiation signature pattern of an aircraft, consisting of at least first and last beacons substantially displaced on the aircraft, where each beacon has a radiation source of a wavelength in substantially the same range as the normally radiated emissions of the aircraft in flight. Each beacon has a maximum radiation intensity of greater than the normally radiated emissions of the aircraft, and a minimum radiation intensity of at least equal to the normally radiated emissions of the aircraft. The first beacon has a modulation sweep cycle of decreasing intensity from maximum intensity to minimum intensity, followed by a snap back to maximum intensity. The last beacon has a modulation sweep cycle of increasing intensity from minimum to maximum intensity, followed by a snap back to minimum intensity. The beacons are synchronized in operation whereas the sum of their respective intensities during modulation sweep cycles remains substantially constant at some level higher than the normally radiated emissions of the aircraft. Preferably, the maximum radiation intensity is at least two times the normally radiated emissions intensity of the aircraft. Preferably, the minimum radiation intensity is at least 1.3 times the normally radiated emissions intensity of the aircraft.

There may be one or more intermediate beacons disposed between the first and last beacons, where the intermediate beacons radiate the same wavelength as the first and last beacons, at the same maximum and minimum radiation intensity. Their modulation sweep cycles would have an increasing intensity from minimum to maximum followed by a decreasing intensity from maximum to minimum; and be synchronized with the first and last beacons whereas the sum of their respective intensities during modulation sweep cycles remains substantially constant, and the center of intensity sweeps uniformly from the first beacon to the last beacon. One or more additional beacons may be mounted on the centerline of the aircraft, such as on the belly or the nose or tail. The modulation sweep cycle of the system may have a time range of 0.25 to 1.5 seconds, and a snap back time of less than 0.1 seconds.

As another example of the invention, there is a method for generating a deceptive signature pattern for an emissions producing asset, consisting of the following steps: Dispose a line or series of adjacent beacons so as to span the emissions producing asset when viewed from at least one angle of approach. The line of adjacent beacons may be just a first and last beacon substantially displaced so as to bracket the asset when viewed from the desired angle of approach or zone of protection, or there may be additional intermediate beacons appearing as a line of adjacent beacons between the first and last beacon when viewed from the desired angle. Then radiate from each beacon a signature signal of a wavelength in substantially the same range as the normally radiated emissions of the protected asset. Modulate the intensity of the signature signals of each beacon between a minimum intensity and a maximum intensity in repetitive cycles.

Operate all the beacons in a synchronous manner so as to combine the signature signals into a total signature pattern such that the intensity of the signature pattern remains greater than the normally radiated emissions of the asset, and the center of intensity of the signature pattern during each cycle moves uniformly across the line of beacons from the first beacon to the last beacon. The maximum intensity is preferably greater than the normally radiated emissions intensity of the asset, and the minimum radiation intensity is at least equal to the normally radiated emissions intensity of the asset, so as to mask those emissions from remote detection. The first beacon may be modulated from maximum to minimum intensity while the next adjacent beacon is modulated from minimum to maximum intensity, and that beacon is then modulated back to minimum while the yet next beacon in the line is modulated upward, and so on down the line over the course of the cycle time, so as to effect the sweep or movement of the center of intensity across the line of beacons from first beacon to last beacon over the course of each modulation cycle. The emissions producing asset of the method may be an aircraft, and may have the first beacon mounted on a first side wingtip and the last beacon mounted on an opposite side wingtip. The beacons may be modulated with a shutter assembly or by other means discussed herein or equivalent, whereby when it is open or in an on state, it permits emissions at maximum intensity and when closed or in an off state permits emissions at minimum intensity. Cycle times and snap back times may be as otherwise discussed throughout this description, or as required by the overall asset and beacon configuration, and the threat vehicle characteristics.

As still yet another example of the invention, there is a system for altering the radiation signature pattern of an emissions producing asset comprising at least first and last beacons spaced apart so as to substantially bracket said asset as viewed from at least one angle of approach, where each beacon has a radiation source of a wavelength in substantially the same range as the normally radiated emissions of the asset. Each beacon has a maximum intensity of emitted radiation of greater than the normally radiated emissions of the asset so as to mask the normal emissions from a threat vehicle seeker.

The first beacon has a repeating modulation cycle of emitted radiation consisting of a period or point of maximum intensity followed immediately or later by a period or point of lower intensity, and followed immediately or later by a snapback or switch to or turn on of the maximum intensity. The last beacon likewise has a repeating modulation cycle of emitted radiation, consisting of a period or point in time at lower intensity followed by a period or point in time of maximum intensity followed by a snapback or switch to or turn off to the lower intensity. Any remaining beacons being disposed between the first and the last beacon have a repeating modulation cycle of emitted radiation with a period or point in time of lower intensity followed by a period or point in time of maximum intensity, followed by a period or point of time of lower intensity lasting until the cycle ends and the snapback occurs for the last beacon.

As in other embodiments, the beacons are all synchronized in the operation of their modulation cycles so that the sum of their respective intensities remains greater than normally radiated emissions of the host asset, and the center of intensity of the radiation emitted from the line of beacons moves uniformly from the first beacon to the last beacon during each cycle.

As in other embodiments, the modulation cycle of the first beacon may have a substantially linear decay of emissions intensity from maximum intensity to lower intensity, and the modulation cycle of the last beacon may have a substantially linear increase of emissions intensity from lower intensity to maximum intensity, and so on for middle beacons. However, when using a line of several beacons, a simple, synchronized switching as between high and low intensities for each beacon in sequence will produce an equivalent effect. It will be apparent upon reflection that the more beacons there are in the line, more than four or five for example, the more closely this type of line modulation will emulate the ramped modulation cycles of a limited beacon set system.

As in other embodiments, each beacon may be enclosed in an outer protective shield transparent to the primary wavelength or band of the radiation source or sources. And the radiation sources may be capable of emitting two or more different wavelengths or bands associated with the normally radiated emissions of the asset. The system may be employed in combination with an incoming missile or threat vehicle detection capability, such as an onboard missile detection system, or a remote missile detection system and a wired or wireless means for communicating a missile warning from the missile detection system to the aircraft or host asset. The system may be automatically or manually reconfigurable and operable in direct response to the direction and missile performance data indicated in the missile warning. The host asset of such a system may be one from among a group of assets consisting of an airborne vehicle, space vehicle, landborne vehicle, waterborne vehicle, amphibious vehicle, and any stationary asset of which normally radiated emissions are an inherent characteristic and can effectively be masked with such a deceptive signature emission system.

Some embodiments of the system may include switching or computer based means for transposing the assignment of modulation cycles to beacons as from a left to right line orientation to a right to left line orientation, whereby the center of intensity of the emitted radiation from the full beacon set moves uniformly from the last beacon to the first beacon during each said cycle, rather than vice versa.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description or drawings, but rather by the appended claims and their equivalents thereto in so far as the law allows.

We claim:

1. A system for altering the radiation signature pattern of an aircraft comprising:
    at least first and last beacons substantially displaced on said aircraft,
        each said beacon comprising a radiation source of a wavelength in substantially the same range as the normally radiated emissions of said aircraft in flight,
        each said beacon having a maximum radiation intensity of greater than said normally radiated emissions of said aircraft, and a minimum radiation intensity of at least equal to said normally radiated emissions of said aircraft,
        said first beacon having a modulation sweep cycle of decreasing intensity from said maximum intensity to said minimum intensity followed by a snap back to said maximum intensity,
        said last beacon having a modulation sweep cycle of increasing intensity from said minimum intensity to said maximum intensity followed by a snap back to said minimum intensity,
        said beacons being synchronized wherein the sum of their respective intensities during said modulation sweep cycles remains substantially constant.

2. A system for altering the radiation signature pattern of an aircraft according to claim 1, said maximum radiation intensity being at least two times the normally radiated emissions intensity of said aircraft, and said minimum radiation intensity being at least 1.3 times said normally radiated emissions intensity of said aircraft.

3. A system for altering the radiation signature pattern of an aircraft according to claim 1, said first beacon mounted on a first side wingtip, said last beacon mounted on an opposite side wingtip.

4. A system for altering the radiation signature pattern of an aircraft according to claim 1, each said beacon being mechanically modulated by a revolving shielded shell, said shell of said first beacon having at least one window for emissions, said window having a leading edge and trailing taper, said shell of said last beacon having at least one window for emissions, said window having a leading taper and trailing edge whereas said leading edge of said first beacon is rotationally synchronized with said leading taper of said last beacon.

5. A system for altering the radiation signature pattern of an aircraft according to claim 1, said wavelength being in the Infrared range.

6. A system for altering the radiation signature pattern of an aircraft according to claim 1, said wavelength comprising wavelengths within the ultraviolet through long wave infrared range.

7. A system for altering the radiation signature pattern of an aircraft according to claim 1, further comprising at least one intermediate beacon disposed between said first and last beacons,
    said intermediate beacon comprising a radiation source of a wavelength in substantially the same range as the normally radiated emissions of said aircraft in flight,
    said intermediate beacon having substantially the same said maximum radiation intensity and the same said minimum radiation intensity,
    said intermediate beacon having a modulation sweep cycle comprising increasing intensity from said minimum intensity to said maximum intensity followed by decreasing intensity from said maximum intensity to said minimum intensity,
    said intermediate beacon being synchronized with said first and last beacons whereas the sum of their respective intensities during said modulation sweep cycles remains substantially constant, and the center of intensity sweeps uniformly from said first beacon to said last beacon.

8. A system for altering the radiation signature pattern of an aircraft according to claim 7, said intermediate beacon mounted at the centerline of said aircraft.

9. A system for altering the radiation signature pattern of an aircraft according to claim 1, aid modulation sweep cycle comprising a time range of 0.25 to 1.5 seconds.

10. A system for altering the radiation signature pattern of an aircraft according to claim 9, said snap back comprising a time range of less than 0.1 seconds.

11. A method for generating a deceptive signature pattern for an emissions producing asset comprising the steps of:
    disposing a line of adjacent beacons so as to span said emissions producing asset when viewed from at least one angle of approach, said line of adjacent beacons comprising at least first and last beacons substantially displaced so as to bracket said asset when viewed from said angle of approach,
    radiating from said beacons a signature signal of a wavelength in substantially the same range as the normally radiated emissions of said asset,
    modulating the intensity of said signature signal of each said beacon between a minimum intensity and a maximum intensity in repetitive cycles,
    operating all said beacons in a synchronous manner so as to combine said signature signals into a said signature pattern such that the intensity of said signature pattern remains greater than said normally radiated emissions and the center of intensity of said signature pattern during each cycle moves uniformly from said first beacon to said last beacon.

12. A method for generating a deceptive signature pattern for an emissions producing asset according to claim 11, said maximum intensity being greater than the normally radiated emissions intensity of said asset, said minimum radiation intensity being at least equal to said normally radiated emissions intensity of said asset.

13. A method for generating a deceptive signature pattern for an emissions producing asset according to claim 11, said step of modulating the intensity comprising modulating the intensity of said first beacon from said maximum intensity to said minimum intensity and concurrently modulating the intensity of the next said adjacent beacon from said minimum intensity to said maximum intensity.

14. A method for generating a deceptive signature pattern for an emissions producing asset according to claim 11, said line of adjacent beacons comprising intermediate beacons disposed between said first and last beacons.

15. A method for generating a deceptive signature pattern for an emissions producing asset according to claim 11, said asset being an aircraft, said first beacon being mounted on a first side wingtip, said last beacon being mounted on an opposite side wingtip.

16. A method for generating a deceptive signature pattern for an emissions producing asset according to claim 13, said step of modulating the intensity comprising mechanically modulating each said beacon with a revolving shielded shell, said shell of said first beacon having at least one window for emissions, said window having a leading edge and trailing taper, said shell of said next said adjacent beacon having at least one window for emissions, said window having a leading taper and trailing edge whereas said leading edge of said first beacon is rotationally synchronized with said leading taper of said next said adjacent beacon.

17. A method for generating a deceptive signature pattern for an emissions producing asset according to claim 11, said step of modulating the intensity comprising mechanically modulating each said beacon with a shutter assembly, whereby when open permits emissions at said maximum intensity and when closed permits emissions at said minimum intensity.

18. A method for generating a deceptive signature pattern for an emissions producing asset according to claim 11, said wavelength being in the Infrared range.

19. A method for generating a deceptive signature pattern for an emissions producing asset according to claim 11, said wavelength comprising wavelengths within the ultraviolet through long wave infrared range.

20. A method for generating a deceptive signature pattern for an emissions producing asset according to claim 15, said cycle comprising a modulation time range of 0.25 to 1.5 seconds, and a snap back time range comprising less than 0.1 seconds.

21. A system for altering the radiation signature pattern of an emissions producing asset comprising at least first and last beacons spaced apart so as to substantially bracket said asset as viewed from at least one angle of approach, each said beacon comprising a radiation source of a wavelength in substantially the same range as the normally radiated emissions of said asset, each said beacon having a maximum intensity of emitted radiation of greater than the normally radiated emissions of said asset, said first beacon having a repeating modulation cycle of said emitted radiation, said cycle comprising a period of said maximum intensity followed by a period of lower intensity followed by a snapback to said maximum intensity, said last beacon having a repeating modulation cycle of said emitted radiation, said cycle comprising a period of said lower intensity followed by a period of said maximum intensity followed by a snapback to said lower intensity, any remaining said beacons being disposed between said first and last beacons and having a repeating modulation cycle of said emitted radiation comprising a period of said lower intensity followed by a period of said maximum intensity followed by a period of said lower intensity, all said beacons being synchronized wherein the sum of their respective intensities remains greater than said normally radiated emissions and the center of intensity of said emitted radiation from all said beacons moves uniformly from said first beacon to said last beacon during each said cycle.

22. A system for altering the radiation signature pattern of an emissions producing asset according to claim 21, the modulation cycle of said first beacon comprising a substantially linear decay of emissions intensity from said maximum intensity to said lower intensity, the modulation cycle of said last beacon comprising a substantially linear increase of emissions intensity from said lower intensity to said maximum intensity, the modulation cycle of said any remaining said beacons comprising a substantially linear increase of emissions intensity from said lower intensity to said maximum intensity and a substantially linear decay of emissions intensity from said maximum intensity to said lower intensity.

23. A system for altering the radiation signature pattern of an emissions producing asset according to claim 21, each said beacon enclosed in an outer protective shield transparent to said wavelength of said radiation source.

24. A system for altering the radiation signature pattern of an emissions producing asset according to claim 21, said wavelength of said radiation sources comprising at least two different wavelengths associated with said normally radiated emissions.

25. A system for altering the radiation signature pattern of an emissions producing asset according to claim 21, said system employed in combination with means for detecting an is incoming missile.

26. A system for altering the radiation signature pattern of an emissions producing asset according to claim 25, said asset being an aircraft, said means for detecting an incoming missile comprising an onboard missile detection system.

27. A system for altering the radiation signature pattern of an emissions producing asset according to claim 25, said asset being an aircraft, said means for detecting an incoming missile comprising a remote missile detection system and a means for communicating a missile warning from said missile detection system to said aircraft.

28. A system for altering the radiation signature pattern of an emissions producing asset according to claim 25, further comprising means for reconfiguring and operating said system in response to the direction and missile performance data indicated in said missile warning.

29. A system for altering the radiation signature pattern of an emissions producing asset according to claim 21, said asset comprising at least one from among a group of assets consisting of an airborne vehicle, space vehicle, landborne vehicle, waterborne vehicle, amphibious vehicle, and a stationary asset of which said normally radiated emissions are an inherent characteristic.

30. A system for altering the radiation signature pattern of an emissions producing asset according to claim 21, further comprising means for transposing the assignment of said modulation cycles to said beacons whereby the center of intensity of said emitted radiation from all said beacons moves uniformly from said last beacon to said first beacon during each said cycle.

* * * * *